United States Patent
Aron

(10) Patent No.: US 12,425,434 B1
(45) Date of Patent: Sep. 23, 2025

(54) SYSTEM AND PROCESS FOR PROVIDING NETWORK INTRUSION DETECTION

(71) Applicant: John G. Aron, Westlake, OH (US)

(72) Inventor: John G. Aron, Westlake, OH (US)

( * ) Notice: Subject to any disclaimer, the term of this patent is extended or adjusted under 35 U.S.C. 154(b) by 0 days.

(21) Appl. No.: 18/647,565

(22) Filed: Apr. 26, 2024

Related U.S. Application Data

(63) Continuation of application No. 17/143,635, filed on Jan. 7, 2021, now abandoned.

(60) Provisional application No. 62/958,975, filed on Jan. 9, 2020.

(51) Int. Cl.
*H04L 9/40* (2022.01)
*G06F 16/14* (2019.01)

(52) U.S. Cl.
CPC ........ *H04L 63/1425* (2013.01); *G06F 16/152* (2019.01); *H04L 63/1416* (2013.01)

(58) Field of Classification Search
CPC ....................... H04L 63/1425; H04L 63/1416; G06F 16/152
See application file for complete search history.

(56) References Cited

U.S. PATENT DOCUMENTS

| | | | |
|---|---|---|---|
| 9,094,288 B1* | 7/2015 | Nucci | H04L 43/026 |
| 10,542,026 B2* | 1/2020 | Christian | G06N 20/00 |
| 11,481,487 B2* | 10/2022 | Halcrow | G06F 21/577 |
| 2002/0040436 A1* | 4/2002 | Davis | G06F 21/602 |
| | | | 713/172 |
| 2003/0120935 A1* | 6/2003 | Teal | H04L 63/0823 |
| | | | 713/188 |
| 2013/0185346 A1* | 7/2013 | Lee | H04L 67/02 |
| | | | 709/201 |
| 2015/0135181 A1* | 5/2015 | Porosanu | G06F 11/1004 |
| | | | 718/100 |
| 2016/0026800 A1* | 1/2016 | Arenburg | H04L 63/107 |
| | | | 726/26 |
| 2017/0032274 A1* | 2/2017 | Yu | G06F 21/316 |
| 2018/0351969 A1* | 12/2018 | MacLeod | H04L 63/145 |
| 2019/0007426 A1* | 1/2019 | Bergström | G06F 21/53 |
| 2019/0132229 A1* | 5/2019 | McCormack | H04L 47/34 |
| 2020/0045059 A1* | 2/2020 | Sifford | H04L 63/145 |
| 2020/0311262 A1* | 10/2020 | Nguyen | G06F 21/554 |
| 2022/0103525 A1* | 3/2022 | Shribman | G06F 16/955 |

FOREIGN PATENT DOCUMENTS

KR   20190125744   * 11/2019   ......... G06F 11/3696

* cited by examiner

*Primary Examiner* — Farid Homayounmehr
*Assistant Examiner* — Mudasiru K Olaegbe

(57) ABSTRACT

Systems and methods for autonomous distributed cyber-secure networking and communication are provided. Detection and mitigation of anomalies is accomplished by detection at a granular level.

17 Claims, 3 Drawing Sheets

SYSTEM AND PROCESS FOR PROVIDING NETWORK INTRUSION DETECTION

CROSS-REFERENCE TO RELATED APPLICATIONS

This application is a continuation of U.S. patent application Ser. No. 17/143,635, filed Jan. 7, 2021, which claims the benefit of U.S. Provisional Patent Application No. 62/958,975, filed Jan. 9, 2020, the entire contents of both of which are incorporated herein by reference.

TECHNICAL FIELD

The disclosures below demonstrate a system and process for improved file integrity management vis-à-vis network intrusion detection and file intrusion management. More specifically, it describes unique methods for the detection and mitigation of potential network threats.

BACKGROUND OF THE DISCLOSURE

The fog of persistent cyber threats continues to cost businesses and governments more and more dollars and time. Network and system intrusions can occur every second and yet not be recognized until years later. Current solutions such as Two Factor Authentication (2FA) and Zero Trust are ideology concepts once heralded as breakthrough concepts in the evolution of Internet security are now recognized as incomplete in addressing modern solutions today. Unnoticed and unmitigated, intrusions can cause both financial damage as well as undermine public trust.

As more products and services become interconnected via computer networks, greater scrutiny must be placed on data retention and security. The world has seen this with high level attacks on government agencies and all-too-common malware attacks on small businesses. In some situations, bad actors act quickly, breach one or more servers, exfiltrate or delete targeted data, and then exit the system having achieved their goal. In other situations, bad actors breach a system and simply wait, maintaining access to harvest critical data and its trends for future nefarious purposes. Bad actors can use malware to hijack a computer and then hold the network for ransom payments or make small changes to critical data or their presence in a system may only leave difficult to detect signs that data has been modified. In some instances, these types of latent attacks are not discovered until days, months, or even years after the initial intrusion. This allows bad actors to not only harvest valuable data and cover their tracks but also to further learn the habits of human intelligence using the system which is useful for reconnaissance analyses.

It is therefore appreciated that a need exists for systems and methods for improved network intrusion detection that utilize granular detection techniques to accurately triage a threat and then mitigate the threat efficiently to reduce the latency of an advanced and persistent network threat and further minimize the cyber kill chain.

The cyber kill chain is referenced years ago as steps involved to successfully conduct an offensive effort. Objectives of offensive efforts are in a chain and have requisite steps of completion of the prior as denoted by industry. Herein, the chain is noted to be a sequential order of reconnaissance, intrusion, exploitation, escalation, lateral movement, obfuscation, and objective(s). The endpoints to these objectives are various controllers, switches, routers, and computing devices such as mobile devices and computers.

It is therefore further appreciated that a need exists for new systems and methods to access and improve the security at the root level of various devices.

BRIEF SUMMARY OF THE DISCLOSURE

In an exemplary embodiment, a method for improved network intrusion detection is provided. The method comprises: generating a first file hash analysis for at least one file on a client node; generating a second file hash analysis for the at least one file; comparing the first file hash analysis with the second file hash analysis to determine if an intrusion has occurred, wherein if the first file hash analysis and the second file hash analysis are identical, generating a third file hash analysis for the at least one file; and, if the first file hash analysis and the second file hash analysis are not identical, generating and transmitting a notification to at least one mobile device, and performing at least one mitigation activity.

In another exemplary embodiment, a system for improved network intrusion detection is provided. The system comprises: a client node, and, an intrusion detection server configured to generate a first file hash analysis for at least one file on the client node; generate a second file hash analysis for the at least one file; compare the first file hash analysis with the second file hash analysis to determine if an intrusion has occurred, wherein if the first file hash analysis and the second file hash analysis are identical, generate a third file hash analysis for the at least one file; and, if the first file hash analysis and the second file hash analysis are not identical, generate and transmit a notification to at least one mobile device, and perform at least one mitigation activity.

In yet another exemplary embodiment, a method for improved network intrusion detection is provided. The method comprises monitoring a plurality of files on a client node; generating a model associated with typical user behavior associated with the plurality of files; detecting at least one data anomaly associated with at least one file of the plurality of files, wherein a data anomaly comprises a deviation from the model associated with typical user behavior; and, generating and transmitting a notification to a mobile device, wherein the notification comprises information related to the data anomaly.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but to add explanation and understanding only.

Figure 1:
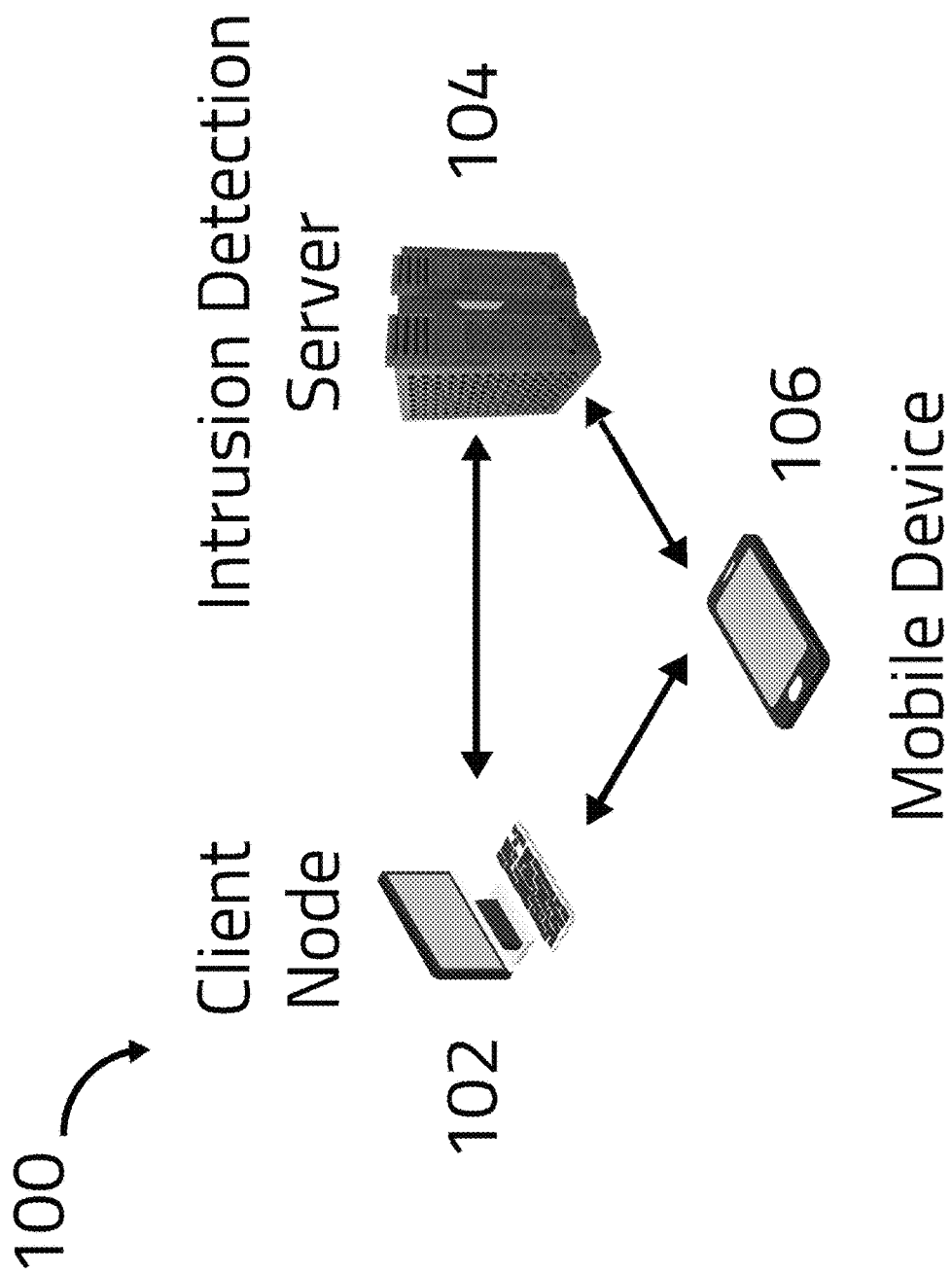
FIG. 1 shows an exemplary network intrusion detection system architecture.

FIG. 1 shows an exemplary network intrusion detection system architecture 100. The system includes at least a client node 102 and an intrusion detection server 104, and in certain embodiments, a mobile device 106. In certain embodiments, the exemplary system architecture 100 may further include additional components, including but not limited to additional client nodes (e.g., servers, workstations, client workstations, routers, switches, controllers, and various other computing devices) or mobile devices. As will become apparent through the detailed description below, it is appreciated that system architecture 100 is designed to operate as a separate and distinct network to provide for the detection of the current state of files at the root of each node with advanced analytics of the distributed network that are intrinsically required for secure system operation by a plurality of network computers.

Client node 102 could be any digital or quantum system comprising one or more network or non-network-connected computers or computing devices. It is appreciated that client node 102 may comprise one or more modules operable to store or transmit digital information. In certain embodiments, client node 102 is a single computing device. Further capability that could be appreciated as bitflips occur from externalities not presented by an attacker but intrinsic to the nature of a digital system or quantum system itself.

In certain exemplary embodiments, the client node 102 is in communication with intrusion detection server 104 and mobile device 106. In certain embodiments, one or more triage or broker servers (not shown) may be used to facilitate secure file transfer between client node 102, intrusion detection server 104, and/or mobile device 106. In some embodiments, intrusion detection server 104 may be operable to communicate with client node 102 and/or mobile device 106 via a hardware or software connection (e.g. via various protocols). In certain embodiments, intrusion detection server 104 may access client node 102 via a computer program installed at the client node 102. For example, the program could be installed at ring 0 within a kernel module or directly added to the kernel operating process as ring 0 provides the opportunity to take complete control of operative actions and processes on client node 102. In some embodiments, in the absence of direct ring 0 access, communication to take control of client node 102 could occur via a computer program previously configured with previously authorized access from, if available, mobile device 106. In some embodiments, in the absence of direct ring 0 access, communication to take control of client 102 could occur via a computer program previously configured with prior authorized access from intrusion detection server 104.

Authentication of each programmatic segment's operative validity may be done with a hardware or software dongle. In some embodiments, the connection may be made in various locations associated with and masquerading as client node 102 operable to communicate on behalf of client node 102 over a network. As used herein, masquerade includes a specific meaning within the field of information technology to be of one identity posing as another identity commonly in regard to concepts as network address translation, piping multiple connections through a unified single output.

Further, it is appreciated the intrusion detection server 104 may communicate with the client node 102 via servers, routers, switches, desktop or mobile computing devices, satellites, access control systems (e.g., single or multi-loop control, i.e., SCADA), various sysadmin tools, virtual machines, and various associated protocols, etc. In certain embodiments, intrusion detection server 104 may leverage non-local computing resources to perform actions related to the client node 102. For example, in some embodiments, intrusion detection server 104 may be configured to utilize processing and storage capability at a mobile device (e.g., mobile device 106).

In certain embodiments, once a connection between the client node 102 and the intrusion detection server 104 is established, a user associated with client node 102 may select one or more files stored at client node 102 to be monitored by the intrusion detection server 104. In some embodiments, these are referred to as target file(s). As used herein, whether reference is made to a file or files it is appreciated that the described systems and methods are equally applied to a single target file or a plurality of target files. In some user configurations, a human user will employ automated non-human processes alone or in addition to their manual input. It is appreciated that a user may comprise a human operator (e.g., systems administrator) or an automated non-human process (e.g a process identification document (PID), robotic process automation (RPA), remote terminal unit, (RTU), programmable logical controller (PLC), etc.). It will be appreciated that certain files may be automatically selected for monitoring by client node 102 for analysis by intrusion detection server 104 based on their critical function and operation of the client node 102.

Certain characteristics of the client node 102 and selected files may be configured to be monitored by the intrusion detection server 104, for example, without limitation, file modification time, file name and size, present and current file hash, current composition of bits that make a file, user or group identification, time, date, etc. Hash as used herein is defined as a one-way function that transforms data from one state to another. A hash function is any function that can be used to map data of arbitrary size to fixed-size values. The values returned by a hash function are called a hash. Hash functions and their associated hash tables are used in data storage and retrieval applications to access data in a small and nearly constant time per retrieval, and storage space fractionally greater than the total space required for the data or records themselves. Hashing is a computationally and storage space efficient form of data access that avoids the non-linear access time of ordered and unordered lists and structured trees, and the often-exponential storage requirements of a direct or indirect access of state spaces of large or variable-length keys.

The file characteristics may be further monitored by taking periodic snapshots (during an automatic interval or one set by the user) of processor or memory load at the client node 102. In some embodiments, intrusion detection server 104 may be configured to monitor trends associated with the selected files and/or associated files. Intrusion detection server 104 may then generate a model of expected behavior associated with the file or files to determine a baseline of activity to detect anomalous behavior. Information relating to the monitored activity or characteristics associated with a given file may be stored in an activity log for that file. In the event of a breach, analysis of the activity logs for affected files can determine an attack path, i.e., which files the attached changed and when, which can help better assess the attack and improve mitigation outcomes. In some embodiments, an attack path visualization may be generated and displayed at a display associated with mobile device 106, intrusion detection server 104, and/or client node 102. Like systems which read associated file metadata, snapshots can be automatically sent off-site for analysis and comparison on a remote device (e.g., mobile device 106). In certain embodiments, these snapshots are stored in a database on intrusion detection server 104 and/or mobile device 106 for a finite time as selected by the user as data becomes obsolete.

In some embodiments, monitoring of the one or more selected files comprises generating a file hash analysis of the selected file(s). Depending on user preference or subscription options or license structure, the file hash analysis of the selected file(s) may occur with granularity, periodically, for example, many times per minute, to once per minute, once per hour, once per day, etc. Each file hash analysis may comprise information relating to the file such as date, time, user or group identity, medium access control (MAC) address, file name, file size, etc. Each file and file hash analysis may be saved in a database, for example, on intrusion detection server 104. In some embodiments, the file and file hash analyses are sent from client node 102 and to the intrusion detection server 104 for analysis. In yet another embodiment, the file hash analysis is performed using an external system (not shown) and uploaded to the intrusion detection server 104. It is appreciated that in certain embodiments, the file hash analysis is performed via execution of computer readable instructions at the client node 102.

For each file hash analysis, the intrusion detection server 104 is configured to perform a comparison of an initial file hash analysis with successive file hash analyses. In some embodiments, for each successive file hash analysis, an n and n−1 comparison is performed. When there is a hash miss, i.e. the initial and a successive file hash analysis are not identical, it indicates that there has been a modification to at least one selected file and a possible intrusion or at minimum an unanticipated file change has occurred and detected. In some embodiments, an n−1 and n+1 hash check on the intrusion detection server 104 is conducted to eliminate false positive reports. In some embodiments, the intrusion detection server 104 may use an algorithm that recognizes analytical changes present in client node 102. Analytical changes include software and hardware interrupt, threading, memory, and file modifications typically associated with human behavior.

Upon detection of a hash miss, intrusion detection server 104 is configured to generate and transmit a network intrusion notification to client node 102 and/or mobile device 106 for authentication and recognition. Depending on system configurations, in certain embodiments, one or more mitigation activities (e.g. deleting a target file, replacing a target file with a copy, etc.) may be performed autonomously before sending the notification. In some embodiments, the notification is generated and transmitted in real-time or near real-time as processor operations are in milliseconds and significantly dependent on the round-trip time of two-way packet transmission. In some embodiments, the frequency of notification is dependent on the level of detail selected from the user, a balance of machine processing costs which could drastically improve mitigation outcomes in the event of system alteration or intrusion. For example, a high frequency of notifications may result in inefficient use of computational resources, i.e. changes that were made to target files that were authorized but not anticipated by the user, however, a high frequency of notifications will make it more likely that an unauthorized breach is discovered quickly. In certain embodiments, mobile device 106 is associated with the client node 102 and may be configured to communicate directly with both the client node 102 and intrusion detection server 104 via an authenticated and secured connection protocol previously linked in the event of an emergency or notifications. In some embodiments, this secure connection closely resembles a mesh network of stand-alone pieces that will continue to behave as a stand-alone system until reconnection to the other, as the kernel process and client could be on a single computational device.

In some embodiments, client node 102 is configured to write related information to system logging facilities on client node 102, not limited to other actions. In some embodiments, intrusion detection server 104 is configured to write to system logging facilities on intrusion detection server 104, not limited to other actions. In some embodiments, mobile device 106 has a remote logging facility wherein intrusion detection server 104 could be configured to communicate with mobile device 106. In some embodiments, when connectivity to mobile device 106 is not possible, the transmission and notification are contained to client node 102 and intrusion detection server 104 as transmission and notification of an event.

In some embodiments, notifications may be set and sent according to a priority or criticality associated with the at least one selected file. The priority of a reminder may be set by a user at the time a file is selected for monitoring by the intrusion detection server 104. Different priorities may have various visual indicators associated with the notification. For example, an urgent need, e.g. the selected file is critical to operation of the client server, may be assigned a visual indicator. An important but not urgent need, e.g. a non-critical file, may be assigned a different visual indicator. It will be appreciated that various additional visual indicators may be used to differentiate various priority hierarchies associated with notifications. In certain embodiments, visual indicators may change color with respect to predetermined time horizons, for example, a color notification may transition to another after a determinant moment of time, etc.

Upon detection of a hash miss, certain mitigation activities may be performed in order to assess and mitigate potential harm of an intrusion. For example, in some embodiments, once a notification associated with a hash miss has been sent to the mobile device 106, the mobile device 106 may be configured to engage in one or more mitigation actions. The mitigation actions may be performed automatically and autonomously (for example, by intrusion detection server 104 and/or mobile device 106) or in combination with at human authenticated selection. In some embodiments, upon receipt of the notification to mobile device 106, the human user may take the client node 102 offline or request a machine stop command to prevent an any transmission of data to an intruder or transmission of infected or modified data to users/clients/etc., associated with the client node 102. In some embodiments, mobile device 106 is configured to cause a copy of the at least one selected file to be pushed and transmitted to the client node 102 and overwrite the current version of the unauthenticated and altered selected file. The amount of adaptation is dependent on the user for an automatic or autonomous response. In such an embodiment, the modification of the at least one selected file is only present for the amount of time between detection and action by the mobile device 106. In some embodiments, a copy of the selected file is sent by the intrusion detection server 104 to the client node 102. In other embodiments, a copy of the selected file stored on mobile device 106 is transmitted to the client node 102. It is further appreciated that the copy of the file may be stored in a different location (e.g. external server associated with client node 102) in some embodiments including client node 102. It is appreciated that in some embodiments without a mobile device 106, mitigation activities described above with reference to mobile device 106 may be performed autonomously by intrusion detection server 104.

In some embodiments, mitigation actions may be previously determined based on user configuration. For example, as there is an application present on mobile device 106 an on setting on mobile device 106 will permit file hash transmissions and analyses between client node 102 and intrusion detection server 104 during the undefined period and send a notification upon identification of a hash miss to mobile device 106 or on client node 102. In some embodiments without mobile device 106, as there is an application present on intrusion detection server 104, an on setting on intrusion detection 104 will permit file hash transmissions to at least one client node 102.

In some embodiments, mitigation actions previously exchanged between client node 102, intrusion detection server 104, and mobile device 106 would continue though no action would be taken as both the kernel operation on ring 0 on client node 102 continue to transmit automatically to intrusion detection server 104. For example, an off setting would cause client node 102, intrusion detection server 104 and mobile device 106 to continue to operate and include future state subsequent file hash analyses misses for the selected file(s) in a defined period (e.g. to stop notifying the user, effectively running yet silent.). In other embodiments, there is an automatic on set after a defined timeout.

In an exemplary embodiment, as system and program updates and upgrades are an inevitable reality of both programs and operating systems, mitigation actions previously sent are authorized to be acceptable to the new hashes that present from an authorization action set on intrusion detection server 104 and if available, mobile device 106. In some embodiments, as the intrusion detection server 104 may use an algorithm that recognizes analytical changes present in client node 102, autonomous and automatic actions to recognize system changes and adapt accordingly across the at least one client node 102, and intrusion detection server 104, and if accessible and previously setup mobile device 106.

In some embodiments, an emergency setting may be used in which on receipt of a hash miss notification from the intrusion detection server 104, certain mitigation actions may be automatically undertaken on behalf of previous authorization from mobile device 106 (e.g. taking client node 102 offline by logically killing the computational pipe of the program on the system, pushing a copy of the selected file to the client node 102 for overwriting from mobile device 106 or from intrusion detection server 104, immediately stopping computations on client node 102 immediately, etc.). In some embodiments, the aforementioned mitigation settings may be modified using mobile device 106. In other embodiments, the aforementioned mitigation settings may only be modified via a secure connection to both the client node 102 and the intrusion detection server 104. In further embodiments, since the files present on mobile device 106 are organized to replace files on the client node 102 either in a human selected action or autonomous and automatic file movement, a data visualization of the environment is viewable and could further show the activity present on client node 102, intrusion detection server 104 and mobile device 106 with the aforementioned uses of color-coded markers. Other data visualizations are contemplated. For example, in the event of a hash miss, one or more activity logs may be analyzed to determine an attack path. In certain embodiments, a data visualization of the attack path is generated and displayed to a user (e.g., at mobile device 106). In some embodiments, intrusion detection server 104 may generate a probability visualization that allows a user to quickly and easily assess the likelihood that a hash miss is indicative of an attack. In certain embodiments the intrusion detection server 104 can create child process RPAs that can scout the network and place themselves whereby network maps can be created, augmented and destroyed as the network changes by indexing file state management information per location It is appreciated that the processes mentioned above may be repeated even after a mitigation activity has taken place. For example, once a file has been identified as having undergone a hash miss and is subsequently overwritten with a copy file, the system will continue to conduct monitoring of that file including repeating hash analyses. In some embodiments, files that have experienced a previous mitigation activity may be subject to stricter monitoring (e.g., hash analysis completed every 20 seconds vs 5 minutes). In some embodiments, the hash analysis frequency for files that have experienced a previous mitigation activity may be automatically adjusted based on the configuration of intrusion detection server 104.

Figure 2:
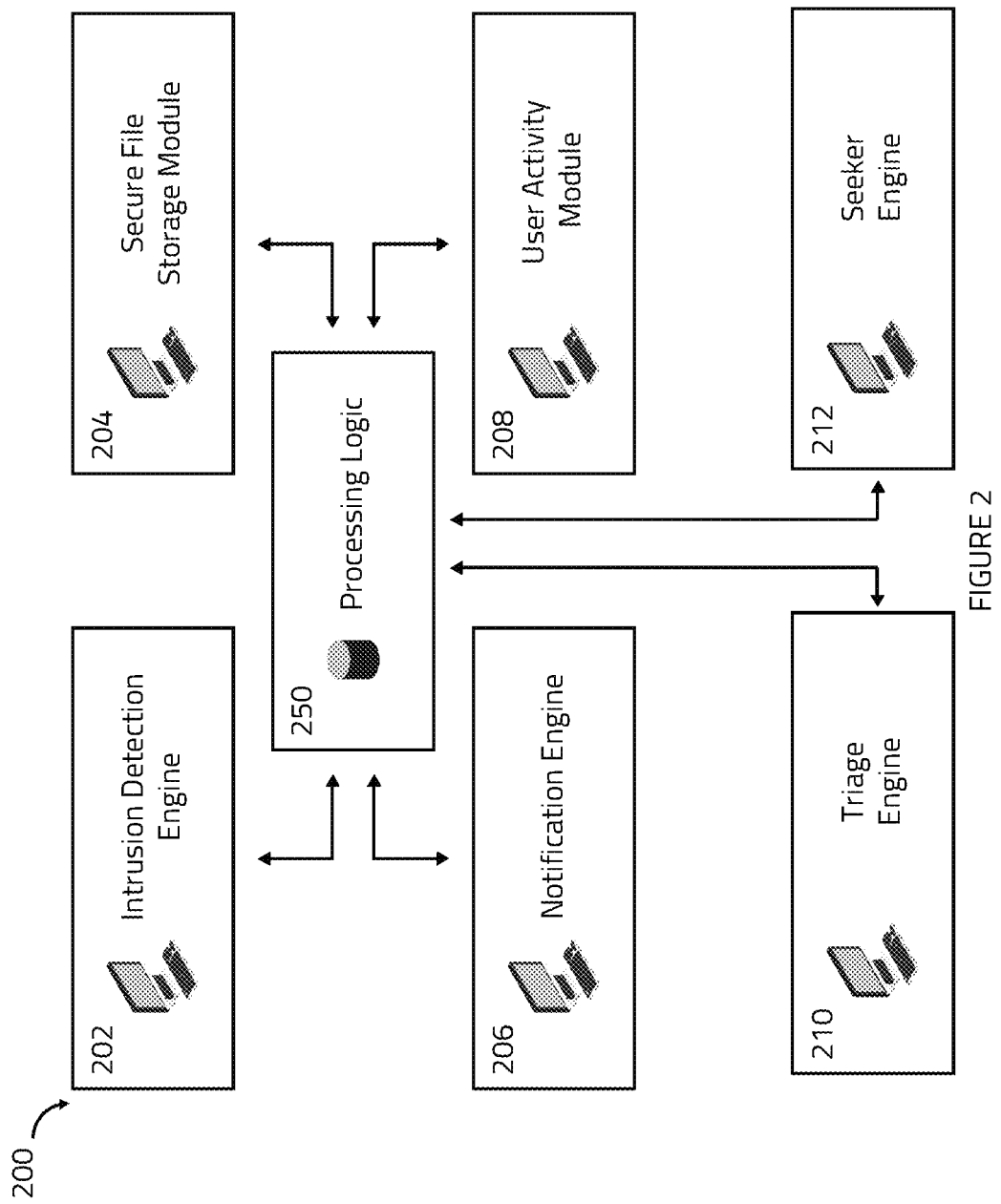
FIG. 2 shows an exemplary network intrusion detection server as shown in FIG. 1; and, FIG. 3 shows an exemplary method for improved network intrusion detection.

FIG. 2 shows an exemplary network intrusion detection server 200 (e.g. intrusion detection server 104). The network intrusion detection server 200 may comprise an intrusion detection engine 202, a secure file storage module 204, a notification engine 206, a user activity module 208, a triage broker engine 210, and a seeker engine 212. In certain embodiments the intrusion detection engine 202, a secure file storage module 204, a notification engine 206, a user activity module 208, triage broker engine 210, and seeker engine 212 are operable to communicate via a processing logic 250. The intrusion detection engine 202 is configured to generate the file hash analyses for the selected files as described herein. Intrusion detection engine 202 is further configured to determine when there has been a hash miss, indicating a possible alteration or intrusion.

Notification engine 206 is configured to generate and transmit notifications relating to a hash miss as determined by the intrusion detection engine 202. The secure file storage module 204 is configured to securely store data relating to the selected files (e.g., activity logs) and their associated file hash analyses. In some embodiments, the secure file storage module is configured to store copies of the target or selected files. In some embodiments, the secure file storage module 204 is configured to securely communicate with one or more external storage servers.

User activity module 208 may be configured to monitor, record, observe, recognize, and interpret user activity and interaction with various components of the intrusion detection server 200. In some embodiments, user behavior observed by the user activity module 208 may classify a hash miss as critical or non-critical. User activity module 208 may be further configured to generate a predictive model based on user activity and behavior associated with one or more files. For example, certain target files may be only adjusted during a certain maintenance window, and therefore any detected hash miss outside of the maintenance window is automatically escalated as suspicious behavior. The model may then be used by the intrusion detection engine to recognize a data anomaly and assess if the anomaly is associated with a breach. In some embodiments, the user activity module may utilize machine learning to create and modify the predictive models.

In some embodiments user activity module 208 can ameliorate an unanticipated file event using an algorithm addressed by the significance of confidence and taking the placed file in the intrusion detection server database and replacing the present unknown file and further seeking prior set options to close the internet protocol connection, using a machine stop of further computational processes, or allowing the machine to watch the operating system intrusion from attacker interactions, as is a honey pot system. A honey pot system herein could be used to gain insight to attacker tools, tactics and procedures. As used herein, a honey pot signifies a machine that is used as a sacrificial computer system that's intended to attract cyberattacks, like a decoy. It mimics a target for hackers and uses their intrusion attempts to gain information about cybercriminals and the way they are operating or to distract them from other targets. Honey pots can be used to learn about intrusions or breach tactics.

Triage broker engine 210 is configured to determine the hierarchy of files relative to importance and security of the at least one client node 102. Seeker engine 212 is configured to create child processes RPAs that can scout the network for changes and place both kernel and client node software on at least one client node 102 whereby when networks are created, augmented and destroyed as the network changes by indexing file state management information per location.

It will be appreciated that the various information transmitted and received by the modules of network intrusion server 200 may be recognized, processed, modified, and interpreted, by the processing logic 250. Processing logic 250 may be further configured to combine and or separate the various functions as performed by intrusion detection engine 202, a secure file storage module 204, a notification engine 206, a user activity module 208 a triage broker engine 210, a seeker engine 212.

Figure 3:
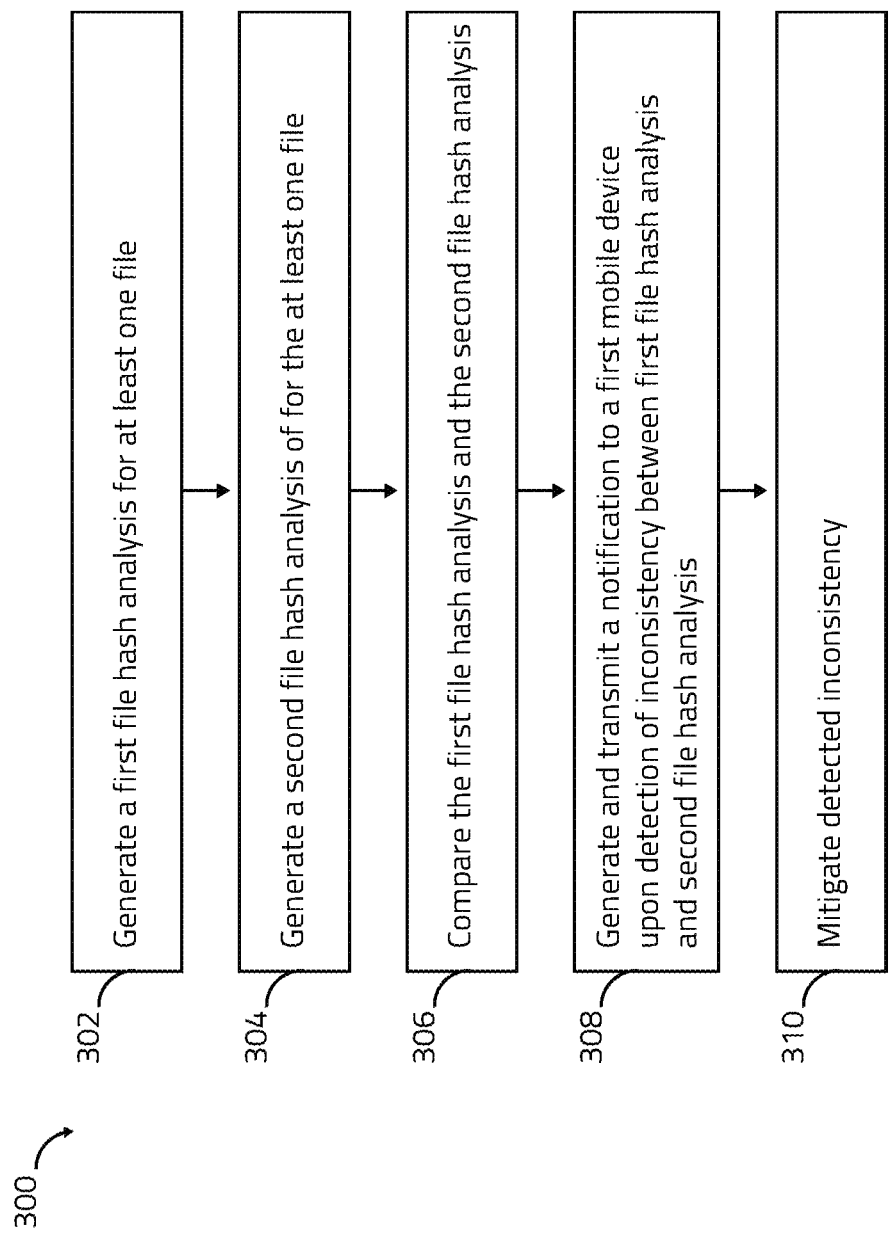

FIG. 3 shows a flow chart of an exemplary method for improved network intrusion detection 300. It will be appreciated that the illustrated method and associated steps may be performed in a different order, with illustrated steps omitted, with additional steps added, or with a combination of reordered, combined, omitted, or additional steps.

At step 302, a first file hash analysis is generated for at least one file. At step 304, a second file hash analysis of the at least one file is generated. At step 306, the first file hash analysis and the second file hash analysis are compared. At step 308, a notification is generated and transmitted upon detection of an inconsistency between the first file hash analysis and the second file hash analysis. At step 310, mitigation actions are performed.

It is appreciated that "Logic" or "circuit" as used herein, includes but is not limited to hardware, firmware, middleware software or combinations of each to perform a function (s) or an action(s). For example, based on a desired application or needs, logic may include a software-controlled microprocessor, discrete logic such as an application specific integrated circuit (ASIC), or other programmed logic device or programmable logic controllers (PLCs). Logic may be fully embodied as software.

"Software", as used herein, includes but is not limited to one or more computer readable executable instructions that cause a computer, logic, or other electronic device to perform functions, actions, or behave in a desired manner. The instructions may be embodied in various forms such as routines, algorithms, modules or programs including separate applications or code from statically or dynamically linked libraries. Software may be implemented in various forms such as a stand-alone program, a function call, a servlet, an applet, instructions stored in a memory, part of an operating system or other type of executable instructions. It will be appreciated by one of ordinary skill in the art that the form of software is independent on, for example, requirements of a desired application, the environment it runs on, the architecture or frameworks on which designs and programs are written, or the desires of a designer/programmer or combinations of the like.

"Module" or "engine" used herein will be appreciated as comprising various configurations of computer hardware or software implemented to perform operations. In some embodiments, modules or engines as described may be represented as instructions operable to be executed by a processor in a processor or memory. In other embodiments, modules or engines as described may be represented as instructions read or executed from readable media. A module or engine may operate in either hardware or software according to application specific parameters or user settings. It will be appreciated by those of skill in the art that such configurations of hardware and software may vary, but remain operable in substantially similar ways.

It is to be understood that the detailed description is intended to be illustrative and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

The invention claimed is:

1. A method providing recognition of normal versus abnormal system behavior for improved intrusion detection, the method comprising:
   generating, from at least one operating system kernel module at ring 0, a first file hash analysis for at least one file on a client node;
   transmitting the first file hash analysis to an intrusion detection server configured to analyze file hash analyses;
   generating, from the at least one operating system kernel module at ring 0, a second file hash analysis for the at least one file;
   transmitting the second file hash analysis to the intrusion detection server;
   comparing the first file hash analysis with the second file hash analysis to determine if an intrusion has occurred, wherein if the first file hash analysis and the second file hash analysis are identical, generating a third file hash analysis for the at least one file; and,
   wherein if the first file hash analysis and the second file hash analysis are not identical, generating and transmitting a secure notification to at least one mobile device, wherein the at least one mobile device is linked to the at least one operating system kernel via a secure and authenticated connection protocol; and
   responsive to a determination that an abnormal system behavior has occurred, causing at least one mitigation activity to be executed at the client node.

2. The method of claim 1, wherein the at least one mitigation activity comprises transmitting a copy of the at least one file from the at least one mobile device to the client node to overwrite the at least one file wherein the at least one mobile device and the client node are not co-located within the same premises.

3. The method of claim 1, wherein the first and second file hash analysis generated from the at least one operating system kernel module at ring 0 is digitally cryptographically signed into which the operating system kernel module is located providing an authenticated firmware interface associated with the client node.

4. The method of claim 1, further comprising:
monitoring bitflips from ring 0 on the at least one client node, wherein a bitflip is indicative of a change in resident electrostatic binary data at the at least one client node.

5. The method of claim 2, wherein the copy of the least one file is stored on the at least one mobile device, wherein the copy of the least one file is selected from amongst a plurality of copies of the at least one file to include shadow copies, wherein the selected copy of the at least one file is representative of unaltered data of the at least one file.

6. The method of claim 1, further comprising:
comparing the first file hash analysis from ring 0 with the second file hash analysis from ring 0 and the second file hash analysis with the third file hash analysis from ring 0 to determine if an intrusion has occurred, wherein if the first file hash analysis and the third file hash analysis are identical, generating a fourth file hash analysis from ring 0 for the at least one file, wherein the comparing and generating steps are repeated at an interval based upon time chip of an architecture-specific onboard clock with the first file hash analysis and a subsequent file hash analysis until a non-identical hash analysis is detected.

7. The method of claim 1, further comprising:
generating a log of activity from ring 0 for the at least one file;
upon detection of a non-identical hash analysis associated with the at least one file, analyzing the log of activity to determine an attack path that is reported to a mobile application.

8. The method of claim 1, further comprising:
determining, by the at least one operating system kernel module at ring 0, a location;
generating a visualization of the attack path for display within a network map of the environment boundary on a mobile application of the representative environment.

9. The method of claim 1, further comprising:
generating, from an operating system kernel module at ring 0 that drops a system into ring 1, to provide at least one robotic process automation (RPA) driver process that is configured to scout and generate a network map based on changes to the network related to file state management and report the computer in the network map using JSON, wherein the network map is viewable on a mobile device application connected to the operating system kernel module.

10. The method of claim 1, wherein the at least one mitigation activity comprises transmitting a command from the at least one mobile device executing a mobile application to remotely pause a process to the at least one client node.

11. The method of claim 3, wherein the vantage of operating system security is from a kernel module digitally and cryptographically signed on the hardware or virtual machine that is configured to monitor activity at ring 0, 1 2, and 3 from security at ring 0 to be aware and differentiate abnormal versus normal operating system behavior of the machine hardware, the end-user behavioral operations and system operation.

12. A system providing abnormal versus normal system behavior resulting in improved intrusion detection, the system comprising:
a client node; and,
an intrusion detection engine configured to, at an operating system kernel module at ring 0,
generate a first file hash analysis for at least one file on the client node;
generate a second file hash analysis for the at least one file;
compare the first file hash analysis with the second file hash analysis to determine if an abnormal system behavior has occurred,
wherein if the first file hash analysis and the second file hash analysis are identical, generate a third file hash analysis for the at least one file; and,
wherein if the first file hash analysis and the second file hash analysis are not identical,
generate and transmit a notification to at least one mobile device executing a mobile application;
receive an instruction in the mobile application, wherein the mobile application is connected to the intrusion detection engine, wherein the mobile application is configured to perform at least one mitigation activity from the mobile device, wherein the mobile application is linked to the at least one operating system kernel via a secure and authenticated connection protocol; and
perform the at least one mitigation activity.

13. The system of claim 12, wherein the instruction to perform at least one mitigation activity is automatically transmitted from the mobile device without user action at the mobile device, wherein the performing the at least one mitigation activity comprises causing a copy of the at least one file to be transmitted to the client node, wherein the copy of the at least one file is used to overwrite the at least one file on the client node.

14. The system of claim 13, wherein the copy of the least one file is stored on the at least one mobile device.

15. The system of claim 13, wherein the kernel module uses a digitally signed safe key for keeping the kernel module in memory to prevent unsanctioned removal from the kernel operating space as well as resulting in tamper-proof security from the kernel module added to the kernel stack.

16. The system of claim 12, wherein the intrusion detection engine is further configured to compare the first file hash analysis with the third file hash analysis to determine if an intrusion has occurred, wherein if the first file hash analysis and the third file hash analysis are identical, generate a fourth file hash analysis for the at least one file, wherein the comparing and generating are repeated within a distinct and preset period with the first file hash analysis and a subsequent file hash analysis until a non-identical hash analysis is detected from ring 0.

17. The system of claim 12, wherein the intrusion detection engine is further configured to:
monitor, at the client node, activity at ring 0 of the at least one file; and,
upon detection of a non-identical hash analysis associated with the at least one file, analyze the activity of the at least one file to determine an attack path.

\* \* \* \* \*